United States Patent Office 2,859,131
Patented Nov. 4, 1958

2,859,131

METHOD OF APPLYING A FILM COMPRISING CHROMIUM OXIDE ON A GLASS SURFACE

George B. Watkins, Toledo, and Lazarus D. Thomas, Walbridge, Ohio, assignors to Libbey-Owens-Ford Glass Company, Toledo, Ohio, a corporation of Ohio No Drawing. Application December 13, 1955
Serial No. 552,691

3 Claims. (Cl. 117—104)

The present invention relates broadly to a method of applying a film to a surface and more particularly to a method of applying a film comprising chromium oxide on a glass or ceramic surface or on a film that has been applied to such a surface.

Generally metal oxide films may be applied to a glass surface by heating the surface to the softening point and spraying an organic or halogen compound of the metal directly on the glass surface. The heated glass surface generally causes the material to decompose and the metal to adhere thereto in the form of an oxide. Preferably the halides of the metal are used and tin oxide films may be formed by spraying solutions containing tin tetrachloride, titanium oxide films may be formed by spraying titanium tetrachloride, and so forth. However, prior to this invention, satisfactory chromium oxide films have not been formed by spraying halides of chromium such as chromium trichloride, and prior to this invention there was no satisfactory method of producing chromium oxide films by spraying liquids containing chromium compounds.

Chromium oxide films have been used to form a base layer for the application of metal films such as gold, and such chromium oxide films have been applied by evaporation techniques. Also chromium oxide films may be applied as a protective layer of other films such as tin oxide film. A chromium oxide film resists reduction with hydrogen and cannot be removed with zinc and hydrochloric acid. It has a further advantage of having a high resistance and serves to provide some insulation as well as protection to an electrically conducting film such as tin oxide. The above mentioned thermal evaporation methods involve expensive equipment and has proven to be considerably more costly than the methods of producing films which involve spraying a heated surface with a liquid which forms the desired film on the heated surface.

Accordingly, it is a primary object of this invention to provide a method of forming a chromium oxide film in which a film is formed by spraying a solution of chromium compound on the surface to which the film is to be adhered.

Another object of this invention is to provide a method of forming a film containing chromium oxide together with other metal oxides.

It has now been found that these and other objects may be accomplished by incorporating an oxygenated chromium compound into a spraying solution, and spraying the solution onto the surface of a heated glass or ceramic surface. In the preferred method of applying the film to a glass sheet, the sheet is passed into and through a tunnel type furnace within which it is heated to substantially its point of softening. After the sheet of glass has reached the required temperature, it is conveyed from the furnace and brought into filming position where it is uniformly sprayed over its surface with the filming liquid containing an oxygenated chromium compound.

In general, any chromyl compound may be used, but preferably a chromyl halide is used. Due to the fact that chromyl compounds are unstable in most solvents it is preferred to use acetic acid, but any solvent in which chromyl compounds are stable is within the scope of this invention.

In order to more fully illustrate the practice of this invention, the following examples are given and it is to be understood that these examples are given for the purposes of illustration only and are not intended to limit the scope of the invention.

EXAMPLE I

A solution consisting of 11% by volume of chromyl chloride and 89% glacial acetic acid was prepared for use as a spraying solution. A clean glass plate 6" x 6" x ¼" was heated to 1300° F., and the chromyl chloride solution sprayed thereon at that temperature. A high reflecting film of yellow color was formed and it was found that the film was very resistant to reducing agents and could not be reduced with a hydrogen flame.

EXAMPLE II

The procedure of Example I was repeated except that the glass was heated to 900° F. It was found that a good chromium oxide film formed on the glass at this temperature.

EXAMPLE III

The procedure of Example I was repeated except that the glass was heated to a temperature of 800° F. A film of chromium oxide formed but it was of very poor quality.

EXAMPLE IV

The procedure of Example I was repeated except that the glass was heated to 700° F. Under these conditions no film formed at all.

EXAMPLE V

The procedure of Example I is repeated except that the glass plates already had a tin oxide film applied thereto and the solution of chromyl chloride was sprayed directly onto the tin oxide film. The tin oxide film had been formed by spraying a solution of tin tetrachloride on the glass surface with the surface heated to a temperature of 1300° F. A film of chromium oxide material formed over the tin oxide film. After the film had been applied, the resistance of the chromium oxide coating was measured by laying leads of the volt-ohmyst directly on the film and spaced about five inches apart. The resistance was high and varied from 5 to 50 megohms.

EXAMPLE VI

A solution was formed by dissolving 100 ml. of tin tetrachloride in 500 ml. of glacial acetic acid, and 0.25 ml. of chromyl chloride was added to 150 ml. of this solution. The resulting solution was sprayed on glass plates which had been heated to about 1300° F. to form a film consisting of both tin oxide and chromium oxide. For the sake of comparison, a tin oxide film was formed by spraying the tin tetrachloride acetic acid solution on another heated glass plate in similar manner.

EXAMPLE VII

A procedure in Example VI was repeated except that 1.0 ml. of chromyl chloride was added to 150 ml. of the tin tetrachloride acetic acid solution. Again a film formed which contained both tin oxide and chromium oxide.

A group of films made according to the procedure of Example I and the film of Example VI were checked to determine the transmittance and reflectance values. Certain of these values are tabulated in Table I below in which $t$ is the thickness of the glass sheet, $T$ is the transmittance, and $R$ is the reflectance.

Table I

| Sample | $t$, inches | Percent T Ill. C | Percent R Ill. C Rear Side | Percent R Ill. C Filmed Side |
| --- | --- | --- | --- | --- |
| Ex. VI | .242 | 55.4 | 27.9 | 28.2 |
| Ex. I-1 | .242 | 62.9 | 29.1 | 31.5 |
| Ex. I-2 | .242 | 60.7 | 28.1 | 28.2 |
| Ex. I-3 | .242 | 70.3 | 14.9 | 15.8 |
| Ex. I-4 | .242 | 66.6 | 17.3 | 19.5 |
| Ex. I-5 | .242 | 60.0 | 18.3 | 19.7 |

Table I above indicates that the chromium oxide film prepared by the method of this invention is a high reflecting transparent film.

Preferably the glass or ceramic material is heated to a temperature of about 1300° F. as indicated in Example I but good films could be formed at temperatures as low as 900° F. as illustrated by Example II. Examples III and IV indicate that a temperature of above 800° F. is needed for satisfactory results, and although a film forms at 800° F. the film is of very poor quality.

Generally, the chromium oxide film is substantially nonconducting and as shown in Example V, the film may be used as an insulating film over electrically conducting films. This insulating property may be of considerable value in safeguarding people who may inadvertently come in contact with the electrically conducting films as well as other uses generally known for electrical insulators.

Chromium oxide may be incorporated into other metal oxide films that may be formed by spraying solutions containing compounds of such metals on hot ceramic surfaces. This was exemplified by Examples VI and VII in which films containing both tin oxide and chromium oxide were formed. The effect of the chromium oxide on the electrical properties of the tin oxide film are given in Table II below in which the surface resistivity of the film in ohms per square of tin oxide films containing various amounts of the chromium oxide were compared with tin oxide films containing no chromium oxide.

Table II

| Sample | Ml. $CrO_2Cl_2$ per 100 ml. $SnCl_4$ In Spraying Solution | Resistivity, Ohms/square |
| --- | --- | --- |
| Tin Oxide | 0 | 8,000 |
| Film of Ex. VI | 1 | 1,000,000 |
| Film of Ex. VII | 4 | ∞ |

From Table II above, it is seen that the addition of small amounts of chromium material to tin halide in the formation of tin oxide films substantially increases the surface resistivity of the resulting tin oxide film. Accordingly, the oxygenated chromium compounds of this invention may be employed as to control the surface resistivity of tin oxide films.

It is to be understood that the forms of the invention disclosed herein are to be taken as the preferred embodiments thereof, and that various procedural changes may be resorted to without departing from the spirit of the invention or the scope of the following claims.

We claim:
1. In a method of forming a film comprising chromium oxide on a glass surface, the steps of heating the glass surface to a temperature above 800° F. and spraying said heated surface with a solution of $CrO_2Cl_2$.
2. A method of forming a film on a glass surface comprising the steps of heating the glass surface to its softening point and spraying the heated surface with a solution containing chromyl chloride and a tin compound.
3. In a method of forming a film on a glass surface, the steps of heating the glass surface to a temperature above 800° F. and spraying the heated surface with a solution of $CrO_2Cl_2$ in acetic acid.

References Cited in the file of this patent
UNITED STATES PATENTS

| 2,617,741 | Lytle | Nov. 21, 1952 |
| 2,689,803 | Ackerman | Sept. 21, 1954 |
| 2,564,707 | Mochel | Aug. 21, 1955 |